June 26, 1934.  C. F. JENKINS  1,964,062
ELECTROOPTICAL DEVICE
Filed Jan. 24, 1930  2 Sheets-Sheet 2
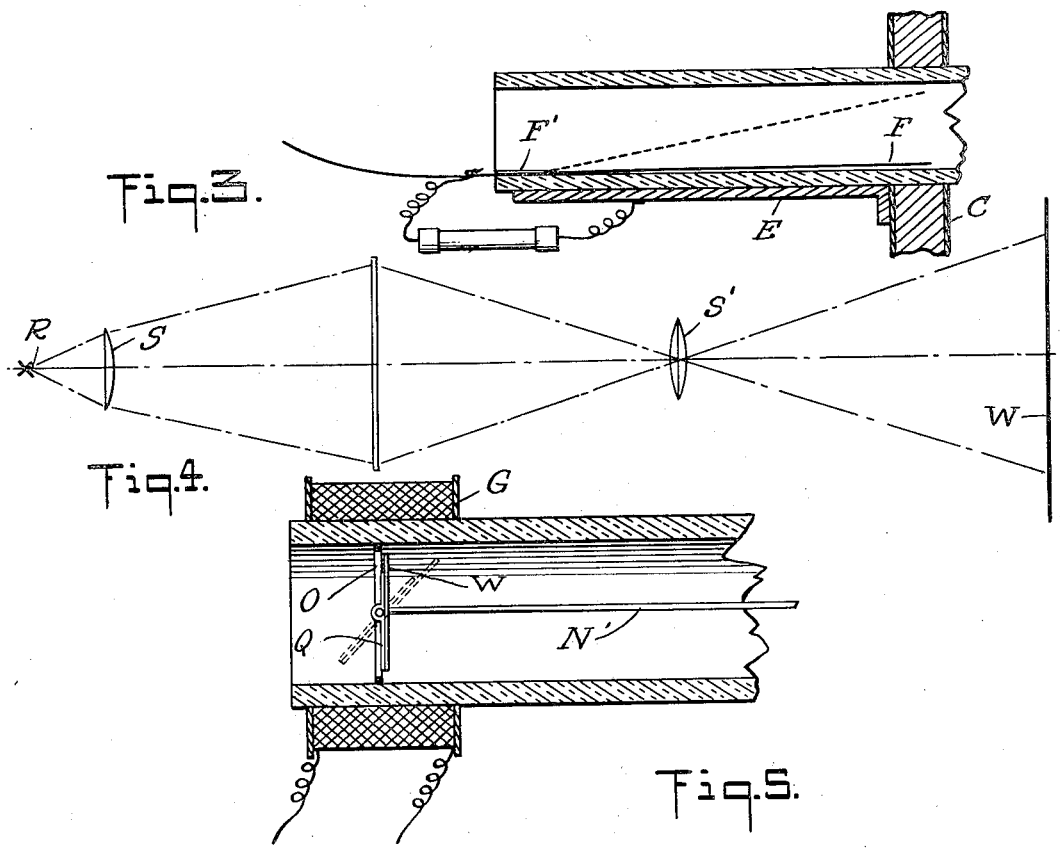
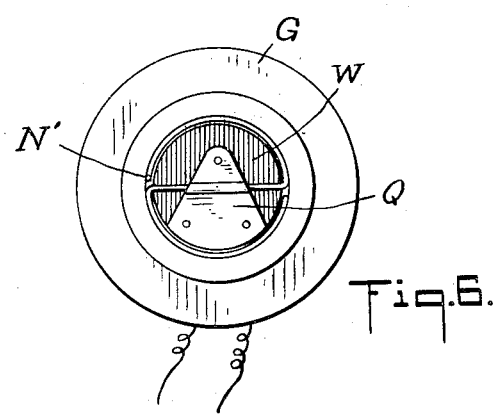
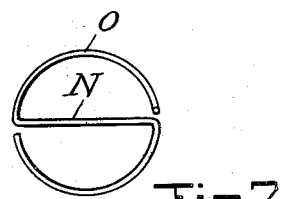
Charles Francis Jenkins
INVENTOR
BY Darby & Darby
his ATTORNEYS Patented June 26, 1934

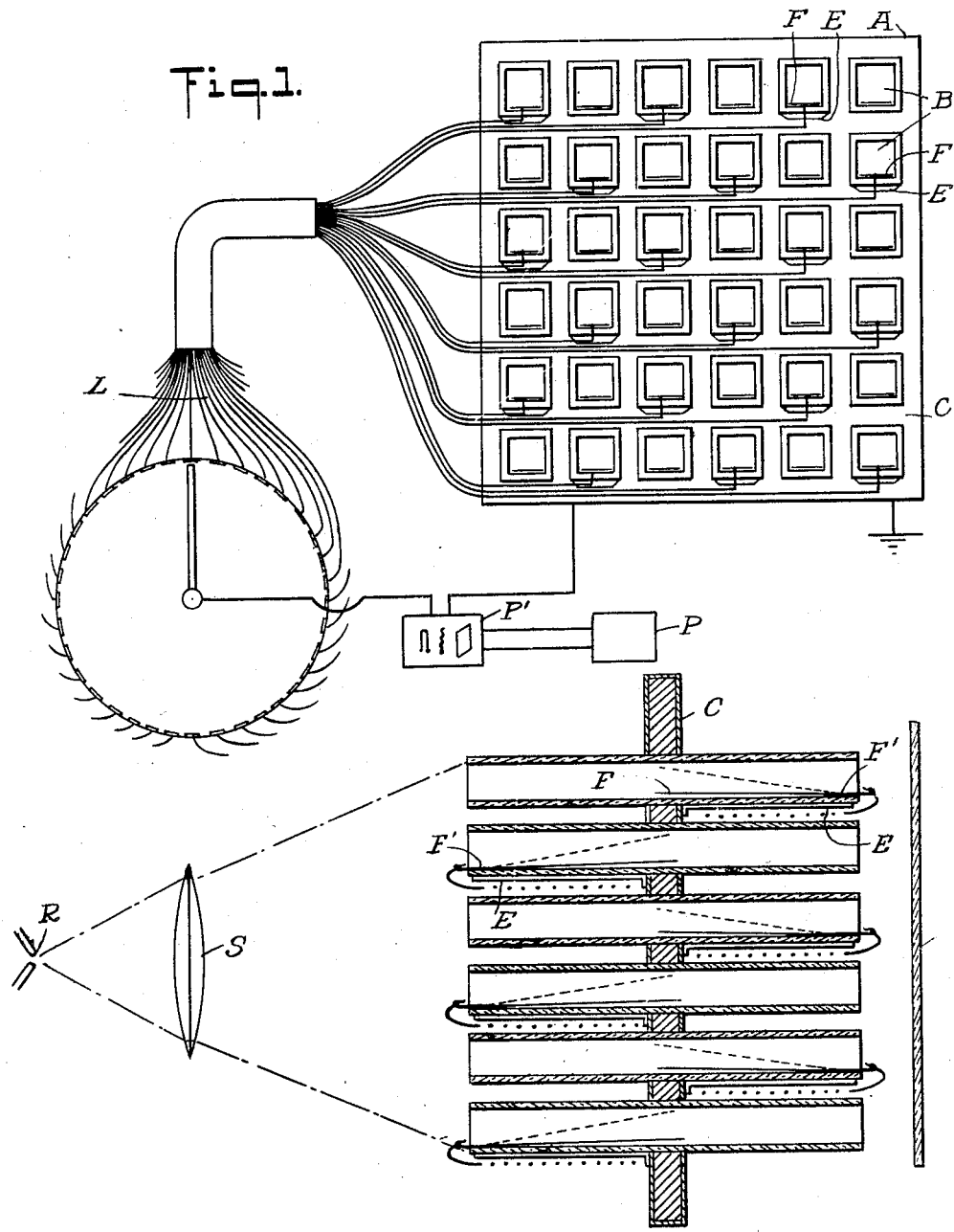

1,964,062

UNITED STATES PATENT OFFICE 1,964,062

ELECTROOPTICAL DEVICE

Charles Francis Jenkins, Washington, D. C., assignor, by mesne assignments, to Radio Corporation of America, a corporation of Delaware Application January 24, 1930, Serial No. 423,021

7 Claims. (Cl. 178—6)

This invention relates to electro-optical systems and with particularity to light valves useful in receivers for radiomovies and television, especially designed for theatre projection.

The method almost universally in vogue in television is the building up of a picture on the retina of the eye of the observer by the rapid movement and intensity fluctuation of a point of light, a result of persistence of vision of the human eye.

Again, the neon lamp, a gaseous light, usually employed because it is the only known light that will change its intensity sufficiently rapidly to meet the requirements, is a light-source of very inferior intensity.

Such a method and light source are extremely inefficient, theoretically, only about one-fiftythousandth of one percent. It is truly amazing that resultant pictures are as good as they are.

A method which substitutes for persistence of vision a persistence of elementary areas of the received picture would seem far more promising of extended development.

Also, if a high intensity electric arc lamp could be substituted for the weak neon lamp as a light source, picture size and brilliancy would seem to be limited only by practical application.

This is the object of this invention, namely (1) to employ a light of almost unlimited intensity; and (2) to substitute persistence of elementary area of the picture for persistence of vision.

This is attained in the invention the subject of this specification by interposing light valves between a light source of high intensity and the picture plane.

The proposal to use light valves to control a single light spot is not new in this art, for both the Kerr cell and the Faraday cell have been suggested. But while these "cells" are adequately fast, difficulties arise in using them.

In the invention the subject of this application light valves of the speed of the Kerr and Faraday cells are not required; a valve having a reaction time of only one-fifteenth of a second is fast enough, whereas the old persistence-ofvision system demands a reaction time of not less than one-fifty-thousandth of a second. Obviously much simpler valves may be employed with this new system, and valves of appreciable mass.

Other advantageous features will be apparent on consideration of the following specifications, the claims, and the accompanying drawings, in which latter—

Fig. 1 is a schematic view showing a reproducing screen or valve plate according to the invention;

Fig. 2 is a vertical sectional view through the screen shown in Fig. 1; this figure also shows the relation between the light source and the valve plate;

Fig. 3 is a detail view of one of the valves according to the invention, showing one preferred manner of leaking off the charge on the plates thereof;

Fig. 4 is a schematic view showing a simple optical system for enabling the invention to be used in theatres and other similar places wherein the image or picture is to be projected upon a relatively large screen;

Fig. 5 shows partially in section a modified form of valve according to the invention;

Figs. 6 and 7 are detail views of the modification shown in Fig. 5.

In the figures, A is a valve-plate or board, supporting light valves B in apertures therein. C is a metallic face-lining which, as later explained, acts as an electrical ground common to all the valves. D is a ground glass diffuser which may be employed when it is desired to soften or blend the elementary light areas of the picture.

Each light valve B, as shown in Figs. 2 and 3, is preferably in the form of a square glass tube. Inserted with the valve tube in the board apertures, and in contact with the underside of each valve tube, is a metallic plate E. If desired the plates E may be fastened to the associated glass tubes in any suitable manner; similarly if desired the individual tubes may be removably fastened in the plate C by any suitable fastening means such as cement, or if desired the tubes may be frictionally retained in position, for example by peening over the perforated edges of the face plate C. As shown more in detail in Fig. 3 each of the plates E at its inner end is bent at right angles to provide a contact with the metallic facing C when the tube is inserted in position. On the inside of each tube, opposite the plate E is a very thin strip F of aluminum, or other suitable member, a gold foil blade, for example. This is affixed to the tube of F' for a fraction of its length at one end, and in staggered relation in adjacent tubes.

In the electrostatic valves shown in Figs. 1, 2, and 3 the valve is normally open, the movable blade member F lying on the floor of the tube until the charging potential lifts the member into the dotted position to close the tube. This charging potential may be derived from any suitable source of image or picture currents P well known in the art, and may be amplified as schematically indicated by the letter P'.

The potential actuates the shutter by the repulsion resulting from a charge thereon of like sign to that on plate E. This charge might be negative, for the plate E (common to all the valves) is preferably grounded to earth.

The potential which charges the valve blade F is led thereto by the wires L (Fig. 2) which, lying between the valve-tube ends and leading outward transversely thereto do not interfere with the passage of light through the tubes from the source R.

To permit the valve to resume its normal position, i. e., with the valve open, a "grid-leak" M is inserted preferably between the grounded plate E and each valve blade F. These leaks are chosen to have a value suited to the picture phenomena, for example, one-fifteenth of a second for radiomovies and television.

These valve elements are integral, simple of construction, and easily replaced in the board (A) in case of damage thereto. The charging wire L is also easily attached by slipping it under the clip-end of the blade F (Fig. 3).

The position of the valve board is shown in schematic Figs. 2 and 3, in which R is the light source, an arc lamp, for example; S a lens for gathering the diverging light rays from the lamp to concentrate them on the valve board A. An objective or projecting lens S' may then be located in front of the valve board if the resultant picture is to be projected onto the screen W.

The valve mounted as shown in Fig. 3, namely with the blade at the bottom, is best adapted to silhouette reception when the incoming signal must block the light. To use the same valve for half-tones, the valve needs only to be turned over and inserted up-side down in the apertures of the valve board or if desired the valves may be mounted so that the strips F deflect about a vertical axis instead of a horizontal axis as shown in Figs. 1, 2 and 3.

The operation of the device is doubtless well understood by those skilled in the art, but a brief description would suggest that the incoming amplified current impulses or signals are distributed to the several light valves as by a commutator K (Fig. 1) to open them in the order in which the picture or image at the transmitting station is being analyzed. The light from the arc lamp R would then be permitted to shine through the several opened valves and build up a facsimile of the picture or image at the transmitting station.

The employment of a "grid-leak" across the circuit of each light valve provides a predetermined time lag in the closing time of each valve irrespective of the lag resulting from the natural impedance on the air on the falling valve blade. There is large latitude, therefore, in the selection of the time of closing of the valve. This method provides the desired persistence of light of each elementary area of the received picture, one of the very important advantages of this system of television reception.

The resultant picture has, therefore, a brilliance comparable to the usual theatre picture because the arc light is shining through the open valves all the time in the light parts of the picture, and simultaneously through the valves which are but partly open to produce the halftone areas of the picture. Obviously the valves which are not opened at all produce the dark portions of the picture.

Referring to Figs. 5, 6 and 7 there is shown a modified form of valve which is adapted to be actuated electromagnetically instead of electrostatically. In this modification the glass tube is preferably cylindrical and has mounted at one end, preferably externally thereof, as indicated in Fig. 5, a suitable solenoid G which is adapted to be energized under control of the incoming image or picture currents. Inside the glass tube a shutter is hung loosely for free rotation on the transverse section N of a wire member O. Said wire member O has a long extension N' by means of which the shutter may be positioned at the proper point within the glass tube, preferably centrally with relation to the solenoid G. As shown clearly in Figs. 6 and 7 the portion N' extends along the wall of the glass tube and does not materially interfere with the light passing therethrough. The shutter member preferably comprises a triangular shaped sector piece Q which is fastened in any suitable manner to a circular disc W, the latter preferably being of non-ferric material. The disc is mounted in any convenient manner for free rotation about the transverse section N as hereinabove described.

As a result of the weight at the base of the portion Q the shutter normally tends to assume a vertical position under control of gravity to close the light tube. When the solenoid G is energized the shutter tends to align itself with the magnetic field extending longitudinally through the tube and thus correspondingly opens the tube for the passage of light.

The manner of assembling the valves such as shown in Fig. 5 is substantially the same as that disclosed in Figs. 1 and 2.

Of the two modifications shown in the drawings the electrostatic valve is the preferred form since it requires very little current for actuation and is well adapted to the potentials used in modern amplifying tubes. The electrostatic type valve also has the advantage that it does not require a contact current distributor since the circuit may be completed through the distributor contacts electrostatically as indicated schematically in Fig. 1.

Broadly, what I have provided in this new method of reception of radiomovies and radiovision is a uniform source of light and a plurality of light obscuring means between said light and the observer.

In a magic lantern slide, or in a single frame on a motion picture film, the light obscuring pattern is made up of the differing degrees of density in the film itself, which, however are fixed for each elementary area of the picture. This new method provides a light obscuring pattern which is constantly changing to produce a facsimile of the moving object or scene at the distant transmitter station.

While specific apparatus and arrangements thereof are disclosed herein, it will be understood that the invention is not limited thereto, and that various changes and modifications may be made without departure from the spirit and scope of the invention.

It will also be understood that while the valves are shown in Fig. 1 as separated from each other an appreciable distance, they will be mounted in as close proximity to each other as is attainable in order that the substantially continuous illuminated surface may in effect be achieved. However, this latter feature is not absolutely necessary, since reliance may be placed upon the spacing of the valves to produce a halftone effect.

What is claimed is:

1. An electro-optical system comprising a source of light of constant intensity, a light obstructing valve, means for instantaneously operating said valve to permit light to pass unobstructedly therethrough, and means including a resistance element for causing said valve to restore gradually.

2. An electro-optical system comprising a light valve, a source of light of constant intensity, a resistance element, means for charging said valve and means for gradually leaking-off said charge through said resistance element.

3. An electro-optical system comprising a source of illumination, a frame, a plurality of open ended tubes extending through said frame, said tubes being of an electrical insulating material, an electrode secured to each of said tubes externally thereof, a second electrode movably secured to said tubes internally thereof and adjacent the external electrode, said movable electrode being adapted to control the amount of light passing from said source of illumination through the tube, and a diffuser element upon which the light passing through said tubes may be cast.

4. The structure recited in claim 3 characterized in that the tubes are substantially square glass tubes and the external and internal electrodes in successive tubes are staggered.

5. An electro-optical system comprising a source of light of constant intensity, a frame, a plurality of substantially cylindrical open ended tubes passing through said frame, a substantially circular light flap pivotally mounted internally of each of said tubes adjacent one of the ends thereof, and electro-magnetic means disposed around each of said tubes adjacent the same end thereof for actuating said pivotally mounted light flap to control the amount of light passing through said tubes from said source of light.

6. A system in accordance with claim 1 in which the means for operating said valve is electromagnetic.

7. A system in accordance with claim 1 in which the means for operating said valve is electrostatic.

CHARLES FRANCIS JENKINS.